United States Patent [19]

Benzinger

[11] 4,164,869

[45] Aug. 21, 1979

[54] THERMOSTAT SYSTEM FOR RADIANT ROOM HEATING

[76] Inventor: Theodor H. Benzinger, 6607 Broxburn Dr., Bethesda, Md. 20014

[21] Appl. No.: 832,759

[22] Filed: Sep. 12, 1977

Related U.S. Application Data

[63] Continuation-in-part of Ser. No. 808,936, Jun. 22, 1977, abandoned.

[51] Int. Cl.² ........................... G01J 5/20; G01J 5/24
[52] U.S. Cl. ........................... 73/355 R; 73/190 EW; 236/6
[58] Field of Search ......... 73/190 H, 190 EW, 355 R, 73/355 EM, 362 AR; 250/337, 352; 237/2 A; 236/6

[56] References Cited

U.S. PATENT DOCUMENTS

| | | | |
|---|---|---|---|
| 2,986,034 | 5/1961 | Jones | 73/355 R |
| 3,062,941 | 11/1962 | White | 236/6 X |
| 3,267,727 | 8/1966 | Benzinger | 73/355 R X |
| 3,405,271 | 10/1968 | Stevens et al. | 73/355 R X |

Primary Examiner—Charles Gorenstein
Attorney, Agent, or Firm—George R. Douglas, Jr.

[57] ABSTRACT

A receiver of thermal radiation of thin film deposit material of high temperature coefficient of electrical resistance having surface absorptive characteristics.

12 Claims, 5 Drawing Figures

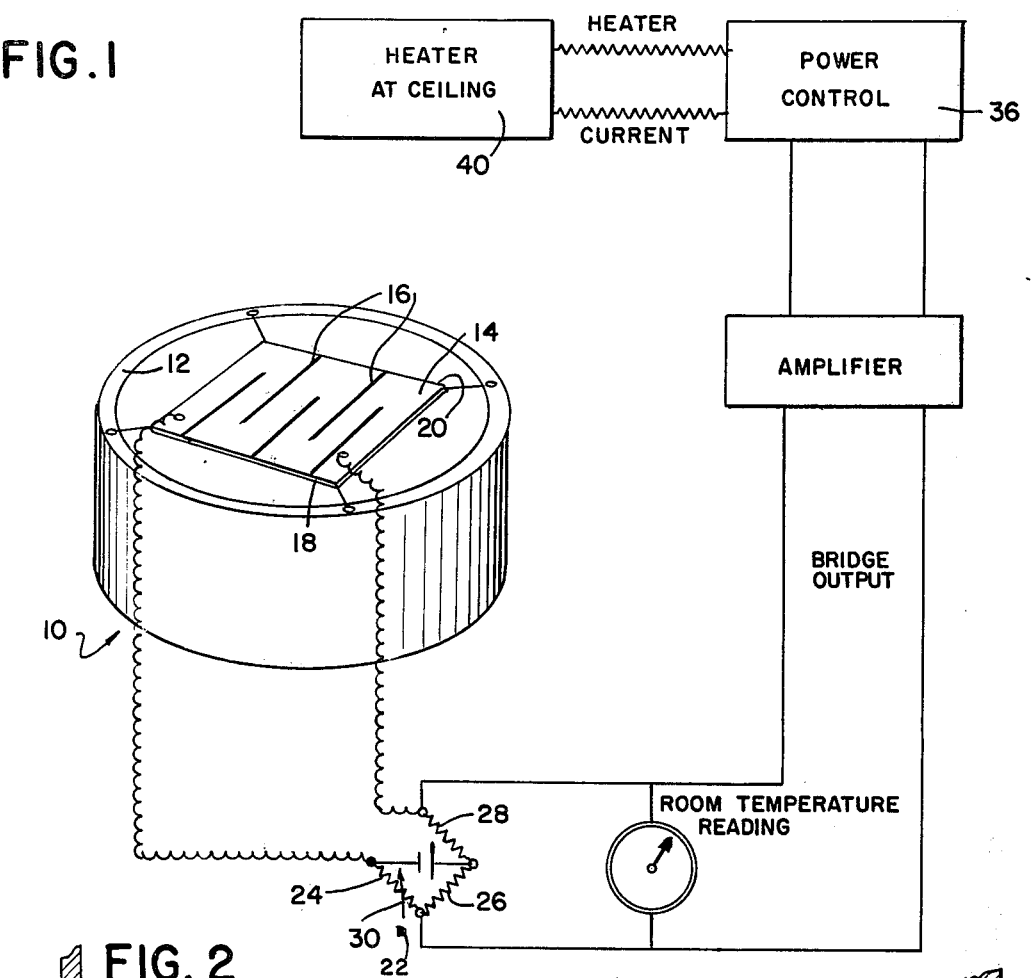
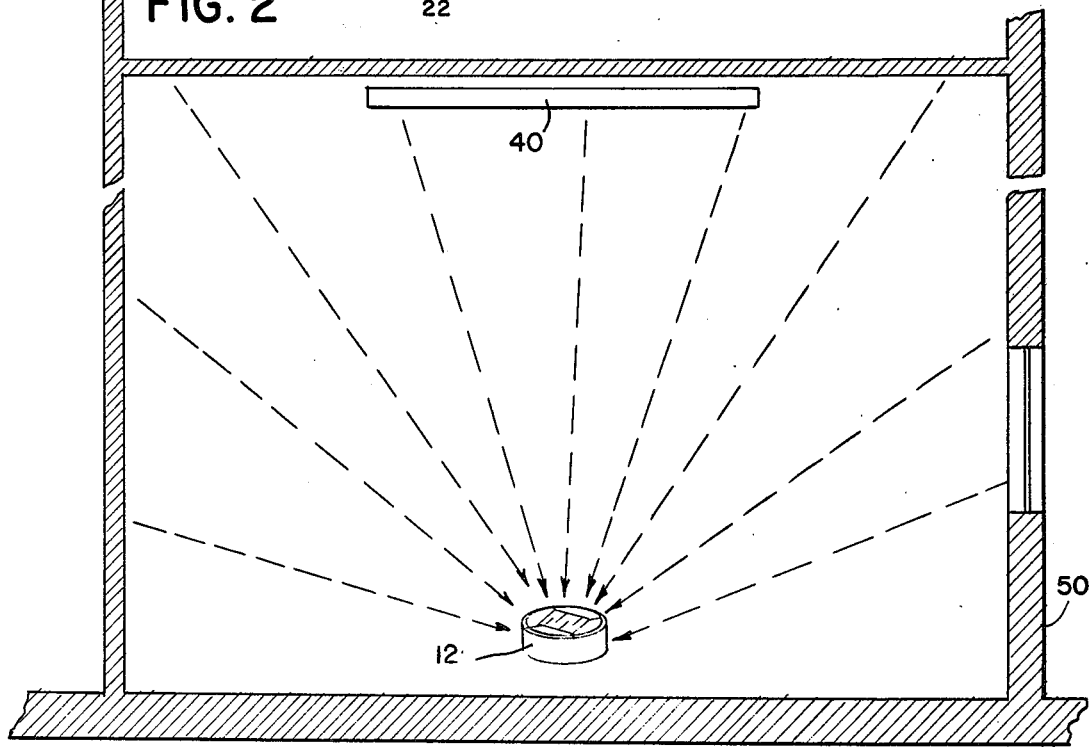

4,164,869

THERMOSTAT SYSTEM FOR RADIANT ROOM HEATING

CROSS-REFERENCES TO RELATED DISCLOSURES

This application is an improvement and departure of my disclosures in Application Ser. No. 808,936, filed June 22, 1977, Group 244, now abandoned of which this is a continuation in part application.

BRIEF SUMMARY OF THE INVENTION

The present invention relates to a receiver means responsive to thermal, infrared radiation having a high temperature coefficient of electrical resistance, and more particularly the invention relates to a Wheatstone bridge network for providing sensitive control means for a radiant room heater system.

BACKGROUND OF THE INVENTION

It has been found recently that it is an energy saving proposition to heat rooms in homes or buildings by means of electric heating panels of generally large sizes, say 8 feet by 6 feet and low temperature, say 60° C. It has been observed that such panels are most efficiently placed at the ceiling, not at or in the walls of rooms.

The question arises, how such rooms can be provided with a thermostat for control from a "sensor" that reflects conditions of human thermal comfort. Obviously, a thermostat on the wall responds to air temperatures conveyed to it by conduction-convection would not properly reflect the comfort provided in the radiant field. A thermostat that is responsive to changes of the radiant field and particularly to a heating system located at the ceiling with control means is therefore the main object and advantage of the invention.

It is known, moreover, that conventional systems of heating and air conditioning operate in cycles of long duration and large amplitude of temperatures which are felt uncomfortably by the occupants. These cycles also lead to sudden onset of convection currents with disturbing noise. It is therefore another object of the invention to avoid these disadvantages in the practice of the new system and invention.

BRIEF SUMMARY OF THE INVENTION

The above and other objects and advantages of the invention will become apparent upon full consideration of the following detailed description and accompanying drawings in which:

FIG. 1 is a schematic diagram and a sensor receiver shown in perspective view illustrating the electrical and system details of the preferred embodiment of the present invention;

FIG. 2 is a typical cross-sectional view of a room or space showing the application of the sensor receiver and in a thermostat system for radiant room heating;

DETAILED DESCRIPTION OF A PREFERRED EMBODIMENT OF THE INVENTION

Figure 3:
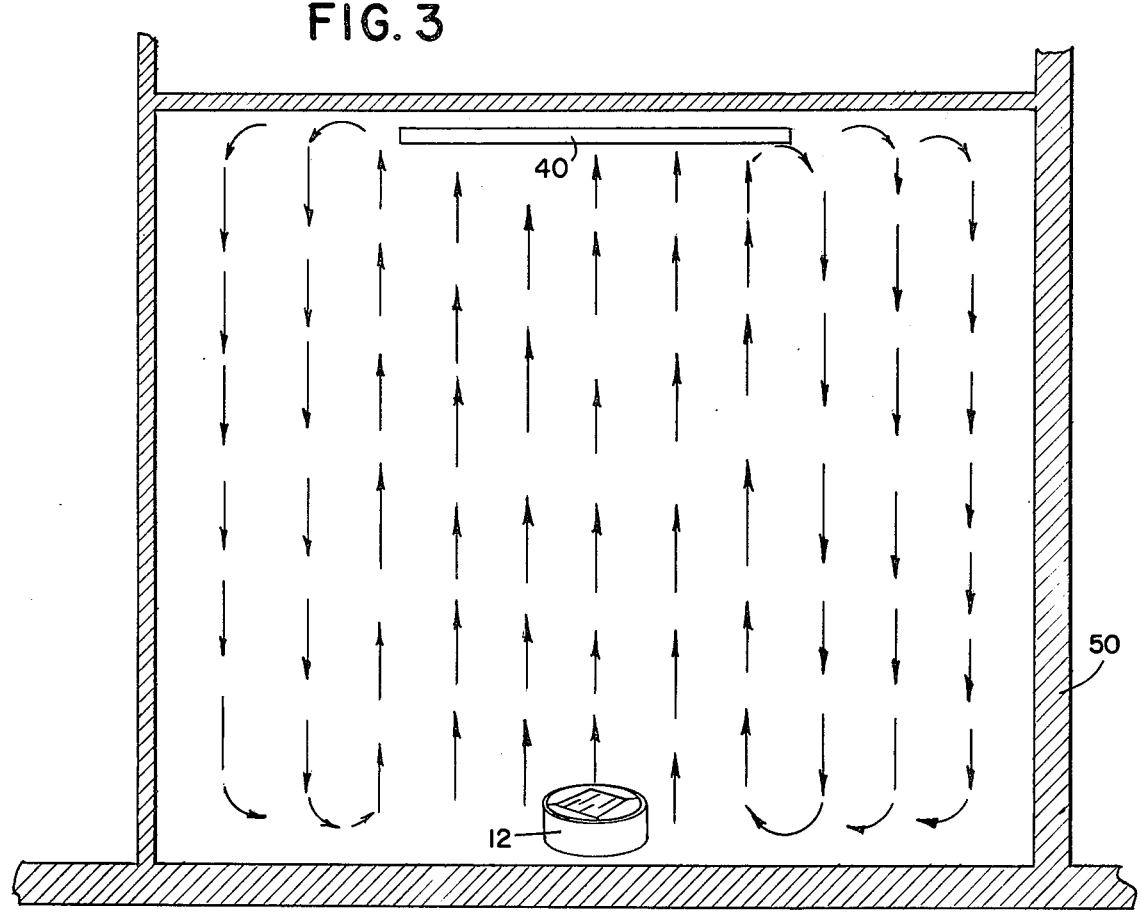
FIG. 3 is a typical cross-sectional view of a room showing the application of the sensor and heater and the resulting expected flow pattern of air using the radiant heater in the ceiling.

With reference now to the drawings there is shown in FIG. 1 a centerpiece of the new thermostat system 10 and a sensor receiver or sensor 12 of radiant temperature.

The sensor 12 consists of a thin film deposit of material 14 with a high temperature coefficient of electrical resistance covering an area of, say one square inch. The surface of this deposit is absorptive (or black) for receipt of maximum thermal radiation in the infrared region. The deposit of material 14 covers a rectangular area of, say one square inch and is cut by alternating sets of separations 16 into a comb-pattern extending from each of the sides 18, 20 as shown. The resistor sensor 12 forms one arm of a Wheatstone bridge 22, the remaining arms 24, 26, 28 of which are made of LTC (Low Temperature Coefficient) material. One of the temperature insensitive arms 24, however, may be adjustable by means of a variable resistor 30 such as a heliopt, on which the corresponding temperature readings for zero-output from the bridge are marked and can be read by the room occupants as they operate the heliopt.

Whenever the temperature of the receiver falls below the "set-point" a potential arises from the bridge and signals to the power control box 36 that an increase or decrease of the existing level of power supply is required. A heater 40 will respond with a rise or fall of its temperature. The sensor will record the change, and the "error potential" from the bridge will disappear when sensor temperature has returned to the "set-point". Control systems of this kind are commercially available, for example, the DAT (Duration Adjustment Type) control in which energy is supplied intermittently at high frequency, and the control adjusts the relative durations of the ON-OFF periods so that the total is at the desired level.

LOCATION OF THE "SENSOR"

Figure 4:
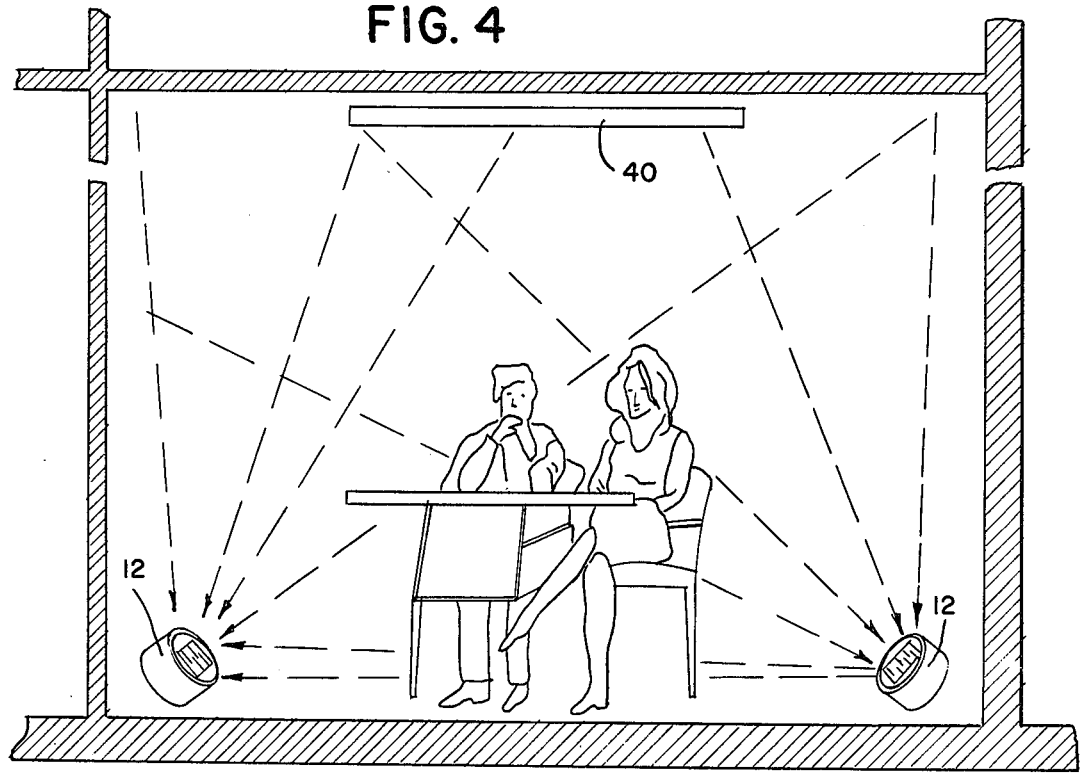
FIG. 4 is a cross-sectional view and representation showing use of two thermostat elements or receivers connected in receivers.
Figure 5:
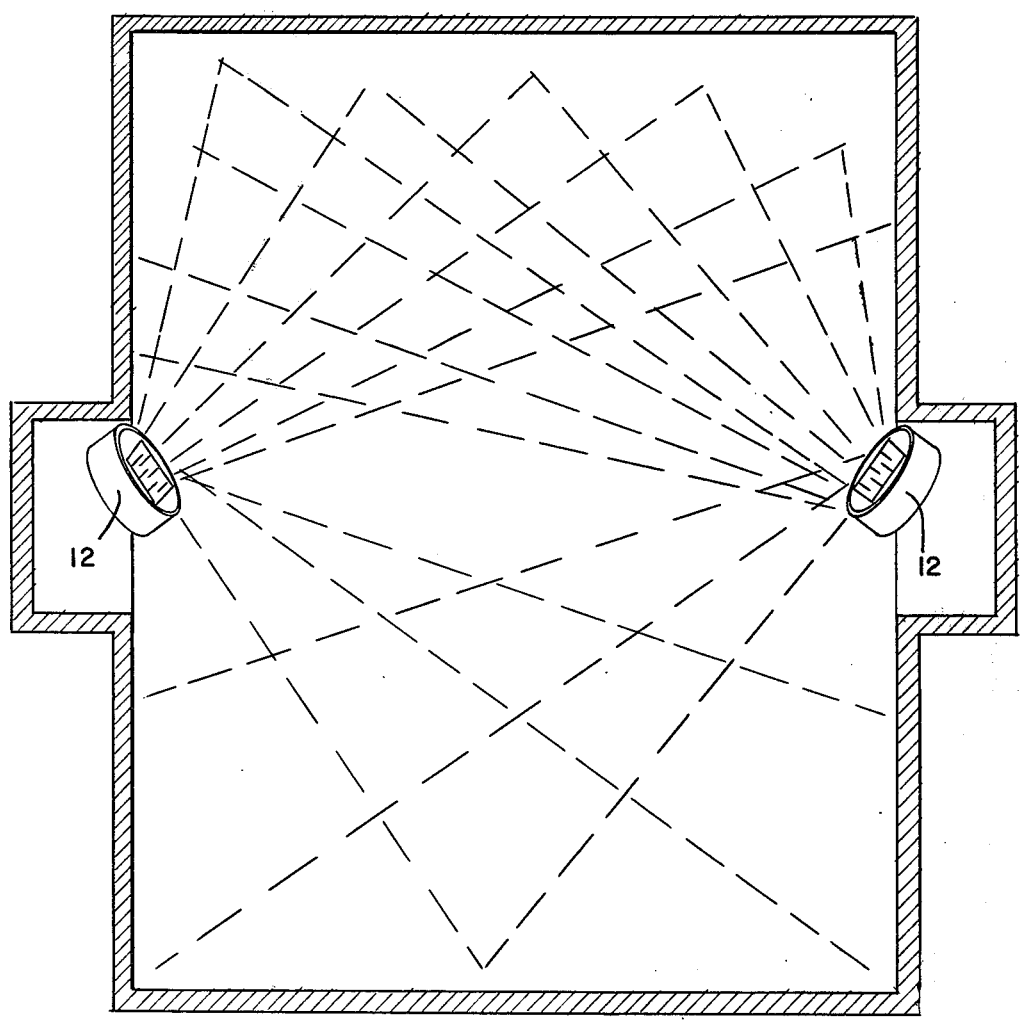
FIG. 5 is a cross-sectional view showing the use of two thermostats as in FIG. 4 with the thermostats installed in recessed locations.

It is of the utmost importance that the "area resistor" or "sensor" 12 "sees" the thermal environment as it would act upon a human occupant in the same or in a similar location or position in the room. Obviously with the radiant heater mounted on the ceiling, the walls of the room will "see" much less of the heater than the floor will see. It is therefore advantageous to place the "sensor" facing upward, say in the center of the floor, as shown in FIGS. 2, 3, and 4 or up to a few feet above as shown in FIG. 5. In these positions the sensor 12 will "see", as the human body would, what is called the plane, two Pi half sphere of "mean radiant temperature" represented by the entire ceiling and to a lesser extent the walls extending the floor. The "area heater", the "controlled variable", will largely determine the "mean radiant temperature" of this particular thermal environment, and will maintain it at it's optimal level for thermal comfort. To be sure, air temperature and air motion participate to some extent in determining heat loss from the surface of a human body. However, under conditions as described above, the heat produced in human metabolism after deduction of evaporative losses is lost mainly (four-fifths) by radiation, whereas conduction by air, in the absence of forced convection, amounts to roughly one-fifth.

Moreover, whenever the heater is energized, the air surrounding the occupants will quickly raise it's temperature toward the level of the "mean radiant temperature" through the following process:

When the control system 10 energizes the "area heater" 40 at the ceiling, heat will be transferred instantaneously (with the velocity of light) to the floor, and raise the temperature of the floor surface. As a result, the air above the floor will become warmer, and "thermal convection" will carry that very air upward in gently rising "thermal currents" while cooler air from the ceiling (outside the "area heater") will gently move downward in a "counter current" mainly along the walls, the temperature of which will be comparatively low, as the walls receive less radiant heat from the ceiling than will be received by the floor. In this way, the air surrounding the occupants will circulate, warm up, and approach the "mean radiant temperature" of the half-sphere (two Pi) represented by ceiling and walls. In short, the heating system will provide a fairly uniform radiant and air temperature for the occupants, and the thermostat at the center of the floor will "see" a representative sample of this temperature.

Whereas, for scientific purposes, it would be preferable to measure the "mean radiant temperature" with an expensive instrument that would rule out any participation from air temperature or air motion, it is desirable for practical purposes to have the influence of air temperature, however slight, included in the thermostat as described because that influence would also be exerted upon the occupants and would contribute to their thermal comfort.

ASSEMBLING THE PARTS OF THE SYSTEM

With reference now to FIG. 2, the whole assembly can be made portable like an ashtray stand to be placed at, or near, the center of the room 50 with a control box and receiver 12 in the foot of a stand, while the head contains the linear bridge, the helipot with "set-point" marks, a digital read-out of sensor temperature and, of course, in the center a small aperture for the sensor-resistor. Power will be supplied from a conventional plug (not shown) in the floor. Wiring between floor and ceiling will connect the control box with the heating panel or panels.

For other space type applications, say in a department store with people walking all over floors, a different arrangement may be preferred. Thermostats could be located in spaces near the intersections of walls and floor, looking upward, say 45° to the ceiling. Since this arrangement would be asymmetrical with respect to walls, two thermostats may be combined to operate one control box by serial wiring, for a representative average radiant temperature. In this case, one of the walls should be exterior and/or fenestrated, the other non-fenestrated and/or interior. For such applications the portable system may look alike the system for "floor center" except for a 45° or upward angle taking its placement near the wall into consideration. However, it may be preferred to let these systems be placed without a stand, into recesses of the wall where they would almost disappear and only show the upward looking aperture of the sensor, the "set-point" dial with it's mark for reading and the digital read-out of the sensor temperature.

SENSOR READ-OUT

It is desirable that occupants could read the sensor temperature with which they are comfortable as individuals. However, simply reading the voltage output from the bridge will not do, because that voltage reads only the deviation from the dialed adjustable "set-point". It is the sum total of the dialed "set-point" temperature and the deviation of sensor temperature from the dialed value that will give the environmental temperature to the reader. The addition of the two voltages in a digital read-out should not present any difficulties.

ALTERNATIVE EMBODIMENTS

If it were desired for any reason, that the sensor respond exclusively to the "mean radiant temperature" of the environment, excluding any participation of air temperature and air motion, two alternative sensors, pure radiometers could be used in the control system of the invention.

(a) Radiometer Using Heatflow Measurement.

This sensor system consists of a metal "heat-sink" of high capacity and conductivity, the temperature of which is measured with a resistance thermometer in units of one millivolt representing one degree Celsius and 20 millivolts, for example, meaning 20° Celsius. Superimposed upon this thermometric voltage is a voltage arising from heat flow through a semi-conductor thermopile into the sink, one millivolt representing the heat flow induced by a temperature difference of one degree Celsius between the surface of the thermopile, which is black and the two Pi radiant environment. The total potential therefore represents the "mean radiant temperature" of the environment in degrees celsius. Influences of air temperature and air motion are eliminated through wiring in series and opposition of a twin thermopile, the surface of which is reflective.

(b) Nul-Point Radiometer

An interlaced pattern of two temperature-sensitive surface resistors, as in FIGS. 4 and 5 one of which is reflective, the other is black, with each resistor forming an adjacent arm of a Wheatstone bridge, the other two arms of which are indifferent to temperature, and balanced, will show zero potential from the bridge, when no radiation impinges upon the twin, interlaced arrangement, that is, when the surface temperature of this receiver and the "mean radiant temperature" of its two Pi environment are identical. Under this condition, "mean radiant temperature" is uniquely represented by the measured temperature of any of the two resistors, or their resistance in series. This nul condition can be produced and manufactured by means of a "heat pump", a semi-conductor thermopile interposed between a "heat sink" and the substrate of the receivers. The heat pump is operated via an amplifier from the output voltage of the bridge. This instrument for measuring "mean radiant temperature" can be used as the sensor of the thermostat system of the invention.

The embodiments of radiometer sensors as in (a) and (b) are described in the inventor's U.S. patent application Ser. No. 808,936, filed June 22, 1977.

(c) Sensor of Resultant Surface Temperature

If it were desired for any reason that the sensor for control of room temperature in the system of the invention be responsive to radiation, conduction and convection in the same manner as a human body with its given surface area and metabolic rate would respond, then the sensor should indicate the "resultant surface temperature", RST, of such an object. This kind of response of the sensor can be realized without any other change or addition, simply by fixing the power supply to the bridge at that level where the sensitive area of the bridge would carry an amount of watts per square centimeter of sensor area corresponding to say, 90 watts per 18,000 square centimeters of a human body surface, that is, 5 milliwatts per square centimeter of sensor surface.

In the four different systems as described with four different sensors, the sensor temperatures at which perfect comfort is observed would differ. However, if the "resultant surface temperature", RST, of the fourth version were translated into "equivalent ideal temperature" the differences would be minor, and probably within the variation between individuals with their different thresholds of skin thermocepter action, and different "set-points" of the "human thermostat" in the brainstem. It must be remembered, moreover, that individuals will choose their own, optimal thermostat settings, and remember them, once they have been chosen using one and the same sensor all the time. It is therefore expected that, regardless of choice of the sensor, the system will fulfill its task, and that economical considerations can determine the choice, without compromises on quality.

SPEED OF RESPONSE

The four sensors differ in their speed of response. The first (a simple area resistor), the third (two area resistors in series), and the fourth (a heated area resistor) will have almost instantaneous responses to changes of the radiant environment (the semi-conductor thermopile of the third version does not have to come to equilibrium in the cycling actions). However, the third version, with two semi-conductor thermopiles, one black, one reflective, in series, will have to come to thermal equilibrium for reading or thermostatic action. It will, therefore, be inferior in speed to the first, third and fourth alternatives.

Additional embodiments of the invention in this specification will occur to others and therefore it is intended that the scope of the invention be limited only by the appended claims and not by the embodiments described hereinabove. Accordingly, reference should be made to the following claims in tetermining the full scope of the invention.

What is claimed is:

1. A thermostat system for radiant room heater system comprising a receiver of thermal radiation constructed and arranged having means sensitive to air temperature and to air convection, said receiver consisting of a thin film deposit of material of a high temperature coefficient of electrical resistance and forming one arm of a Wheatstone bridge, the other arms of which being substantially insensitive to temperature, said materials being supported on a film of electrically insulating material, said deposit having a plane surface area of precisely defined size and absorptive for infrared radiation and facing a two-Pi hemispherical environment.

2. The invention according to claim 1 wherein the material is deposited by etching in a "comb-pattern" arrangement resulting in an optimized resistor of greater length and smaller width compared with a solid sheet of rectangular shape.

3. The invention according to claim 1 wherein the material deposited on a thin substrate is non-conductively suspended in a frame means.

4. The invention according to claim 1 wherein one temperature-insensitive arm of the bridge is adjustable to determine the "set-point" temperature of the receiver where the voltage output of the bridge is desired to be zero, or to have some predetermined value.

5. The invention according to claim 1 in which the voltage output from the bridge includes means to control power input of the room heater system.

6. The invention according to claim 5 wherein said control means is of an "ON-OFF" type.

7. The invention according to claim 5 wherein said control means is constructed and arranged to be responsive and directly proportional to the relationship between sensor output and heater input.

8. The invention according to claim 7 wherein the receiver positioned on or above floor level and faces a hemispherical, two Pi radiant field of ceiling and walls, part of which form the radiant room heater system and with control means responsive to the receiver for controlling the power input to the radiant room heater system.

9. The invention according to claim 7 wherein bridge outputs from more than one receiver are wired in series for combined measurement and control action with receivers positioned at opposite walls and near the intersections of wall and floor facing the opposite wall and ceiling, the walls so chosen that one is exterior and/or fenestrated, the other interior and non-fenestrated.

10. The invention according to claim 9 in which the bridge-current input to the receiver is raised to correspond in calories per unit time per unit surface area to a human metabolic rate of heat production assumed to exist in the occupants.

11. The invention according to claim 10 wherein sets of the receivers are used in series in space heat control.

12. The invention according to claim 10 wherein the system is positioned in a space cavity of generally uniform air and wall temperatures and in an absence of convection at a temperature of ideal human thermal comfort, for example, a temperature of 25° C.

* * * * *